(12) United States Patent
Bakx

(10) Patent No.: US 7,742,373 B2
(45) Date of Patent: Jun. 22, 2010

(54) OPTICAL DISK DRIVE FOR SCANNING AN OPTICAL DISK CARRYING A GROOVE WITH A WOBBLE

(75) Inventor: Jan Bakx, Eindhoven (NL)

(73) Assignee: Lite-On It Corporation, Taipei (TW)

( * ) Notice: Subject to any disclaimer, the term of this patent is extended or adjusted under 35 U.S.C. 154(b) by 486 days.

(21) Appl. No.: 11/774,175

(22) Filed: Jul. 6, 2007

(65) Prior Publication Data
US 2009/0010146 A1    Jan. 8, 2009

(51) Int. Cl.
*G11B 7/00* (2006.01)
(52) U.S. Cl. .................... 369/53.34; 369/53.22
(58) Field of Classification Search .............. None
See application file for complete search history.

(56) References Cited

U.S. PATENT DOCUMENTS 5,848,050 A * 12/1998 Nagasawa et al. ........ 369/275.4
6,667,949 B2 * 12/2003 Stek et al. ................ 369/275.3
2007/0091734 A1 * 4/2007 Lin ........................... 369/30.13
2008/0175138 A1 * 7/2008 Miyagawa ............... 369/275.4

* cited by examiner

*Primary Examiner*—Peter Vincent Agustin
*Assistant Examiner*—Emily Frank
(74) *Attorney, Agent, or Firm*—WPAT, PC; Justin King

(57) ABSTRACT

An optical disk drive for scanning an optical disk having a wobbled groove and a land portion separating adjacent parts of the groove. The optical disk drive has a beam generator for generating a read beam and directing the read beam to the optical disk, a sensor for sensing a reflected beam produced by the optical disk upon receiving the read beam and for producing a sensor output signal with a sensor output signal amplitude, and an envelope analyzer to receive the sensor output signal from the sensor, to analyze an envelope (WS1e, WS2e) of the sensor output signal amplitude, and to derive from a variation of the envelope (WS1e, WS2e) as a function of time an indicator indicating whether the read beam is directed to the groove or to the land portion.

26 Claims, 10 Drawing Sheets

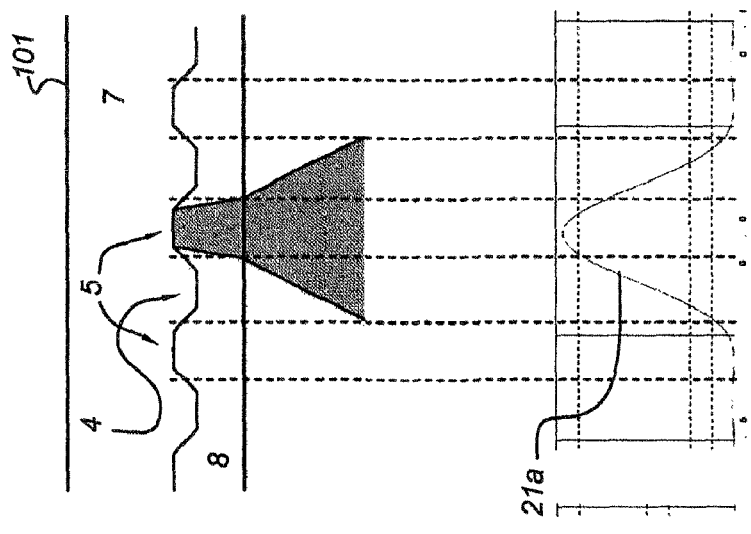
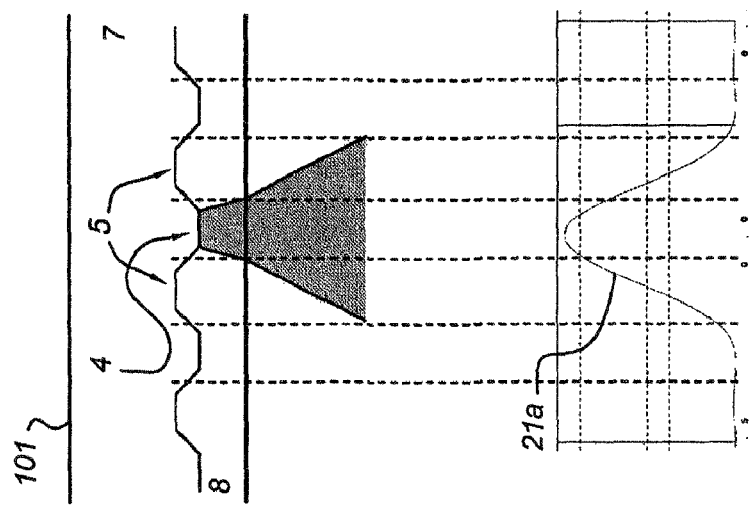
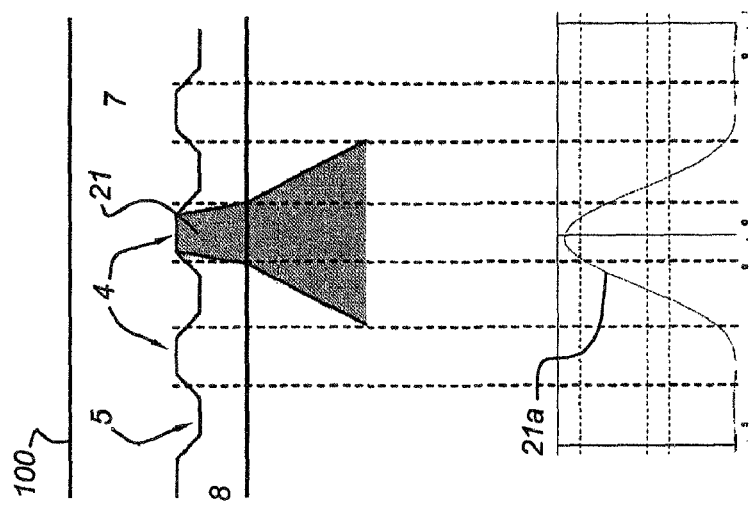

OPTICAL DISK DRIVE FOR SCANNING AN OPTICAL DISK CARRYING A GROOVE WITH A WOBBLE

TECHNICAL FIELD

The invention relates to an optical disk drive for scanning an optical disk comprising a substantially circular groove and a land portion separating adjacent parts of the groove, the groove being wobbled. The invention further relates to a method for assisting in scanning an optical disk with an optical disk drive.

PRIOR ART

Such an optical disk drive is known from U.S. Pat. No. 6,667,949 (B2), which discloses a device for scanning an optical record carrier comprising a track for carrying data encoded in optical marks, a parameter of the track having a periodic variation, a so-called wobble, which track comprises reference elements interrupting the periodic variation, which device comprises a head and control means for scanning the track, and detection means for detecting the phase of the periodic variation after the reference elements, and setting means for setting the control means in dependence of a property of the record carrier indicated by the phase. Moreover, it discloses such a device in which the head is arranged for scanning the track by a scanning beam via an entry side of the record carrier and the control means are arranged for performing tracking control in accordance with a tracking signal generated by the head, the track comprising a groove arranged in a surrounding surface, also called land, and wherein the setting means comprise controllable inverting means for whether or not inverting the tracking signal in dependence of a property of the record carrier indicated by the phase. The phase is indicative of whether or not the bottom of the groove is closer to the entry side than the surrounding surface, each of the situations being possible to occur depending on the disk manufacturing process as described in detail in U.S. Pat. No. 6,667,949.

However, in U.S. Pat. No. 6,667,949 the wobble of the track can be read on land and in groove, independent of the polarity of the tracking error signal. The track carries a reference element and the phase of the wobble after the reference element indicates whether the tracked track is the groove or the land. A disadvantage is that the method is not broadly applicable, e.g., the method can not be applied when wobble readout is not guaranteed on both land and groove, or when the track does not have reference elements. Notably, the method does not work when the disk carries a continuous groove. Also, recently new recording materials are occasionally used which cause a change in the polarity of the tracking signal, such that the tracking signal can have any sign when the bottom of the groove is closer to the entry side or further away from the entry side than the surrounding surface, depending on which recording material has been used on the optical disk.

SUMMARY OF THE INVENTION

The present invention aims to provide an optical disk drive which can reliably detect whether the optical head is tracking the wobbled groove or the surrounding land surface, independent of the manufacturing method of the disk and the recording material used on the disk and independent of specific structures in the track, and which can adapt the tracking control such as to track the groove after it has been detected that the tracking is done on the land instead of the groove. The present invention also aims to provide a method for assisting in tracking the wobbled groove of an optical disk with an optical disk drive. The present invention also aims to provide a computer program product for assisting in tracking the wobbled groove of an optical disk with an optical disk drive.

Hereto the optical disk drive according to the present invention is characterised in that the optical disk drive comprises:
- a beam generator for generating a read beam and directing the read beam to the optical disk,
- a sensor for sensing a reflected beam produced by the optical disk upon receiving the read beam, and for producing a sensor output signal with a sensor output signal amplitude, and
- an envelope analyzer arranged to:
  - receive the sensor output signal from the sensor,
  - analyze a first envelope of the sensor output signal amplitude,
  - derive from a variation of the first envelope as a function of time, an indicator indicating whether the read beam is directed to the groove or to the land portion.

The beam generator may comprise a laser diode generating a laser beam, and one or more optical elements, such as a collimator lens, an objective lens and a beam splitter, in order to direct the beam to the optical disk.

The sensor may comprise a segmented photodiode in order to capture the intensity in multiple parts of the reflected beam and produce a sensor output signal from a sum and/or a difference of the intensities.

The sensor output signal may be a signal generated from a difference between two intensities in two substantially symmetric parts of the reflected beam while the read beam is directed to the groove or land of the optical disk, as known by a person skilled in the art as the radial track error signal, or wobble signal. When the reflected beam is directed to the wobbled groove with a sinusoidal wobble, the amplitude of this wobble signal will oscillate as a sinusoidal with a small variation of the envelope of this amplitude as a function of time, i.e., of typically 10-30%. When the reflected beam is directed to the land portion however, the amplitude of this wobble signal will oscillate as a sine wave with a large variation of the envelope of the amplitude as a function of time, as the wobble signal is then essentially composed of two contributions, one from either side of the land, i.e., one from each neighbouring groove. As the groove at the inner side of the land has a slightly different spatial wobble frequency than the groove at the outer side of the land, the contributions from either side result in a sensor signal with a beat between the two frequencies. The two contributions will interfere constructively at positions along the tangential direction of the land where the wobbles of both grooves are in phase, and will interfere destructively at positions along the tangential direction of the land where the wobbles of both grooves are in counter-phase. The envelope of the amplitude of the wobble signal could thus vary between substantially zero and a maximum value when the beam is directed to the land portion. Due to practical reasons, e.g., the width of the area on the disk where the incident beam—the spot—is reflected by the disk not being restricted to the width of the land, the interference will not always be that large, and the variation of the envelope will typically be 70-90% when the beam is directed to the land portion.

The indicator can be of any suitable type. The indicator may, e.g., be a signal, a register value, a value in memory, or a variable in a software program.

The optical disk drive according to the invention may further comprise
- a tracking actuator for positioning the read beam at a radial position along the disk, and
- a tracking control device arranged to:
  - receive the sensor output signal from the sensor,
  - generate a tracking error signal from the sensor output signal,
  - drive the tracking actuator in dependence of the tracking error signal and a tracking error polarity selector, the tracking error polarity selector having either a first value or a second value, the second value being different from the first value, in order to position the read beam directed to either the groove or the land portion, depending on the value of the tracking error polarity selector.

The tracking control device can thus selectively drive the tracking actuator to direct the read beam to either the groove or the land portion. When the read beam is directed to the land portion when the tracking control device drives the tracking actuator with one value of the tracking error polarity selector, the read beam will be directed to the groove portion when the tracking control device drives the tracking actuator with the other value of the tracking error polarity selector.

In a preferred embodiment, in order to drive the tracking actuator in dependence of the tracking error signal with a tracking error signal polarity and the tracking error polarity selector, the tracking control device is arranged to invert the tracking error signal polarity when the tracking error polarity selector has the second value and the tracking control device is arranged to not invert the tracking error signal polarity when the tracking error polarity selector has the first value.

The positive and negative slope of the tracking error signal correspond with the center of the land portion and the center of the groove. Therefore changing the polarity of the tracking error signal, i.e., inverting the signal, results in a change in directing the read beam from the land portion to the groove, or vice versa. This polarity inversion is easily implemented in signal processing systems of modern optical disk drive.

In a further embodiment, the tracking error polarity selector has a preferred tracking error polarity selector value in order to position the read beam directed to the groove. In other words, the value of the tracking error polarity selector needed to be applied to the tracking error signal in order to direct the beam to the groove is derived by the optical disk drive, or a priori assumed to be known by the disk drive.

Preferably, the tracking control device is arranged to derive the preferred tracking error polarity selector value from the indicator. As the indicator is derived from an actual operation condition of the disk in the optical disk drive, deriving the preferred tracking error polarity selector value from the found indicator provides a reliable and robust way to decide on the value needed for directing the beam to the groove. This is preferably derived by the tracking control device, but the person skilled in the art will recognize that this could also be implemented in a different functional unit in the optical disk drive, as long as the tracking control device has access to the resulting value and can apply the value of the preferred tracking error polarity selector for driving the tracking actuator.

In order to derive the preferred tracking error polarity selector value from the indicator, the tracking control device may be arranged to:
- set the preferred tracking error polarity selector value to the first value when the indicator indicates that the read beam is directed to the groove when the tracking error polarity selector has the first value,
- set the preferred tracking error polarity selector value to the second value when the indicator indicates that the read beam is directed to the land portion when the tracking error polarity selector has the first value,
- set the preferred tracking error polarity selector value to the first value when the indicator indicates that the read beam is directed to the land portion when the tracking error polarity selector has the second value,
- set the preferred tracking error polarity selector value to the second value when the indicator indicates that the read beam is directed to the groove when the tracking error polarity selector has the second value.

The tracking control device will thus be able to derive the preferred tracking error polarity selector value from the indicator for each of the situations that can occur when an arbitrary disk type, i.e., for which a yet unknown tracking error polarity corresponds to directing the beam to the groove, is scanned by the optical disk drive, and for each value of the tracking error polarity value when sensing the reflected beam. When the optical disk drive would be scanning the disk and directing the read beam to the groove, the indicator will be derived correspondingly, and the preferred tracking error polarity selector value will be set to the value of the tracking error polarity selector that is actually used by the tracking actuator during scanning. When the optical disk drive would have used the other value of the tracking error polarity selector, the read beam would have beam directed to the land portion, the indicator would have been derived accordingly, and the preferred tracking error polarity selector value would be set to the other value of the tracking error polarity selector than the one that was actually used by the tracking actuator during scanning, as the indicator would have indicated that the beam was not directed to the groove but to the land.

In a preferred embodiment, the envelope analyzer is arranged to measure a modulation depth of the first envelope as the variation of the first envelope as a function of time.

The modulation depth will be relatively large, i.e., the envelope will fluctuate strongly, when the beam was directed to the land portion, and the modulation depth will be relatively small when the beam was directed to the groove. The modulation depth M is defined here as $M=(Emax-Emin)/Emax$, with Emax being the maximum value of the envelope, i.e., the maximum peak-peak value of the amplitude of the signal over time, and Emin being the minimum value of the envelope. Other definitions may also be used.

Hence, the envelope analyzer may be arranged to set the indicator to indicate that the read beam is directed to the groove when the modulation depth of the envelope is smaller than a first modulation threshold. This first modulation threshold can be 50%, and is preferably 30%, for the definition of the modulation depth given above. Equivalent values should be derived for other definitions.

Likewise, the envelope analyzer may be arranged to set the indicator to indicate that the read beam is directed to the land portion when the modulation depth of the envelope is larger than a second modulation threshold. This second modulation threshold can be 50%, and is preferably 70%.

In an alternative embodiment, the envelope analyzer is arranged to measure a standard deviation of the first envelope as the variation of the first envelope as a function of time. Equivalently, it may measure the variance, being the square of the standard deviation, or any other statistical measure of a similar kind. The standard deviation will be relatively large when the beam was directed to the land portion, and the standard deviation be relatively small when the beam was directed to the groove. The standard deviation can, e.g., be measured from an acquisition into a histogram of the values of the envelope, i.e., of the peak-peak amplitudes of the sensor output signal, or estimated from a running sum.

Hence, the envelope analyzer may be arranged to set the indicator to indicate that the read beam is directed to the groove when the standard deviation of the envelope is smaller than a first standard deviation threshold, and may be arranged to set the indicator to indicate that the read beam is directed to the land portion when the standard deviation of the envelope is larger than a second standard deviation threshold. The applied value of the standard deviation threshold depends somewhat of the spot geometry, e.g., with respect to the amount of crosstalk. The first standard deviation threshold can be 25%, and is preferably 15%. The second standard deviation threshold can be 25%, and is preferably 35%.

In another embodiment of the invention, the envelope analyzer is arranged to:
 analyze the first envelope of the sensor output signal amplitude when the tracking control device drives the tracking actuator with the first value of the tracking error polarity selector,
 analyze a second envelope of the sensor output signal amplitude when the tracking control device drives the tracking actuator with the second value of the tracking error polarity selector,
 derive from a comparison of the variation of the first envelope as a function of time and a variation of the second envelope as a function of time, the indicator indicating whether the read beam is directed to the groove or to the land portion.

The advantage of comparing the variations under the two tracking conditions with either value of the tracking error polarity selector, is that this gives an even more robust and reliable indication. Whereas an accidental poor quality of the read beam received by the disk, e.g., due to the disk being positioned with some tilt with respect to the incident beam, could result in a lower variation when the read beam is directed to the land portion than it would be with a good beam quality, or in a larger variation when the read beam is directed to the groove than it would be with a good beam quality. For example, when the spot is asymmetric in the radial direction and has a larger intensity towards the outer track of the disk than towards the inner track, the tracking may be away from the center of the track, and, moreover, the large intensity side of the spot will result in a significant contribution of the wobble on that side of the track. When tracking a land portion with an asymmetric spot, the contribution from the wobble on the groove on one side may than be significantly larger than that from the other side, such that the interference will no longer be fully destructive when the two wobbles are in counter-phase, resulting in a lower modulation depth when the beam is directed to the land portion than it would have otherwise. Likewise, when tracking a groove with an asymmetric spot, the contribution from the wobble of a neighboring groove may become more significant, such that it gives some partially destructive interference the two wobbles are in counter-phase, resulting in a larger modulation depth when the beam is directed to the groove portion than it would have otherwise. This could have the risk of deriving a wrong value for the indicator when that is based on a single measurement, i.e., a measurement of the variation with one value of the tracking error polarity selector. A comparison of the variations when driving the tracking actuator with each of the two values of the tracking error polarity selector will however still be reliable.

Preferably, driving with the first value of the tracking error polarity selector and driving with the second value of the tracking error polarity selector is done on substantially the same radial positions of the optical disk.

This eliminates possible effects due to local effects on the disk, e.g., a black spot or an artifact in the physical structure of the track. The variation may be measured as a function of time during a number of disk rotations while driving the tracking actuator with one value of the tracking error polarity selector, then returning to the start position of the first measurement, change from the groove to the adjacent land or vice versa, and then continue to measure the variation during a similar number of disk rotations while driving the tracking actuator with the other value of the tracking error polarity selector. The second measurement may also be done in an immediately adjacent region, without returning to the start position of the first measurement, but continuing at the position where the first measurement has stopped.

In a preferred embodiment, the envelope analyzer is arranged to
 measure a first modulation depth of the first envelope as the variation of the first envelope as a function of time, and
 measure a second modulation depth of the second envelope as the variation of the second envelope as a function of time, and
 set the indicator to indicate that the read beam is directed to the groove when the first modulation depth is smaller than the second modulation depth,
 set the indicator to indicate that the read beam is directed to the land portion when the second modulation depth is smaller than the first modulation depth.

As discussed above, the comparison of the two modulation depths is a reliable and robust discrimination between the two situations, the beam being directed to the groove or the land portion, also under non-optimal conditions such as, e.g., an asymmetric spot profile due to disk tilt.

In an alternative embodiment, the envelope analyzer is arranged to
 measure a first standard deviation of the first envelope as the variation of the first envelope as a function of time, and
 measure a second standard deviation of the second envelope as the variation of the second envelope as a function of time. and
 set the indicator to indicate that the read beam is directed to the groove when the first standard deviation is smaller than the second standard deviation,
 set the indicator to indicate that the read beam is directed to the land portion when the second standard deviation is smaller than the first standard deviation.

Like the comparison of the two modulation depths is a reliable and robust discrimination between the two situations, the comparison of the two standard deviations, or any similar statistical measure, is an equally well reliable and robust discrimination.

Preferably, the optical disk drive may execute a start-up procedure each time an optical disk is loaded into the optical disk drive and each time the optical disk drive is turned on after a power-off or stand-by, and the envelope analyzer is arranged to derive the indicator during the startup procedure. This guarantees that the correct indicator is used each time the optical disk drive is scanning an optical disk. Once the indicator has been derived, the optical disk is classified and the disk drive can decide to keep the indicator at the same value. The optical disk drive may also continue to derive the indicator while the optical disk is being scanned, in order to monitor the scanning process and be able to signal erroneous tracking behaviour.

In an advantageous embodiment, the optical disk drive further comprises a signal processor arranged to:
- receive the sensor signal,
- apply an automatic gain control circuit (AGC) driven by a gain control signal to the sensor signal, and the envelope analyzer is arranged to:
- receive the gain control signal,
- use the gain control signal in order to analyze the first envelope of the sensor output signal amplitude.

The optical disk drive may use such a gain control circuit to obtain a gained signal with a well-defined amplitude to be fed into an analogue-to-digital converter (ADC). This allows the ADC to digitize the (gained) signal with its full digital resolution. The digitized signal can than be further processed in the signal processor, e.g., to retrieve data coded in the wobble, as is know to people skilled in the art. Normally the gain control signal is made available by such a signal processor to an external programmable processor or an internal programmable processor core, allowing to, e.g., implement a function to monitor the behaviour of the AGC and the risk of saturation of the ADC. The embodiment of the invention uses this same gain control signal as a measure for the envelope of the sensor signal, as its variation is directly related to the variation of the envelope. A measurement of the standard deviation, or equivalently the variance, or the modulation depth of the gain control signal is thus very suited in order to analyze the envelope of the sensor signal.

Preferably, the gain control signal is a digital signal, such that is easily processed in a digital processor. In an advantageous embodiment, the envelope analyzer is implemented in the digital processor. The digital processor can be any type of programmable device, including the types known as a digital signal processor, a microcontroller, a (programmable) gate array, a computer CPU, a programmable core in an application specific integrated circuit (ASIC).

The method, for use with an optical disk drive, according to the present invention is characterized in that the method comprises:
- receiving the sensor output signal from the sensor,
- analyzing a first envelope of the sensor output signal amplitude,
- deriving from a variation of the first envelope as a function of time, an indicator indicating whether the read beam is directed to the groove or to the land portion.

The sensor output signal may be a signal generated from a difference between two intensities in two substantially symmetric parts of the reflected beam while the read beam is directed to the optical disk, as known by a person skilled in the art as the radial track error signal, or wobble signal. When the reflected beam is directed to the wobbled groove with a sinusoidal wobble, the amplitude of this wobble signal will oscillate as a sinusoidal with a small variation of the envelope of this amplitude as a function of time. When the reflected beam is directed to the land portion however, the amplitude of this wobble signal will oscillate as a sinusoidal with a large variation of the envelope of the amplitude as a function of time, as the wobble signal is then essentially composed of two contributions, one from either side of the land, i.e., one from each neighbouring groove. As the groove at the inner side of the land has a different spatial wobble frequency as the groove at the outer side of the land, the contributions from either side result in a signal with a beat between the two frequencies. The two contributions will interfere constructively at positions along the tangential direction of the land where the wobble of both grooves is in phase, and will interfere destructively at positions along the tangential direction of the land where the wobble of both grooves is in counter-phase. The envelope of the amplitude of the wobble signal can thus vary between zero and a maximum value, when the beam is directed to the land portion. Due to practical reasons, e.g., the width of the area on the disk where the incident beam is reflected by the disk—the spot—not being restricted to the width of the land, the interference will not always be this large, and the modulation depth will typically be 70-90% when the beam is directed to the land portion.

The indicator can be of any suitable type. The indicator may, e.g., be a signal, a register value, a value in memory, or a variable on a software program. The indicator may be used real-time or stored in some memory and used later. The method may be implemented in the optical disk drive, or in another device cooperating with the disk drive. When the optical disk drive is placed in a computer, the method may, e.g., be implemented in the computer CPU.

In an embodiment, the method further comprises:
- deriving a preferred tracking error polarity selector value from the indicator,
  - generating a tracking error signal from the sensor output signal,
  - driving a tracking actuator for positioning the read beam at a radial position along the disk in dependence of the tracking error signal and a tracking error polarity selector, with the value of the tracking error polarity selector being the preferred tracking error polarity selector value in order to position the read beam directed to the groove.

The method thus allows to discriminate whether the read beam was directed to the groove or the land portion, and adapt the operation of the tracking actuator such as to position the read beam so as to be directed to the groove independent of the disk type.

In a further embodiment, the method further comprises:
- analyzing the first envelope of the sensor output signal amplitude when the tracking control device drives the tracking actuator with a first value of the tracking error polarity selector,
- analyzing a second envelope of the sensor output signal amplitude when the tracking control device drives the tracking actuator with a second value of the tracking error polarity selector, the second value of the tracking error polarity selector being different from the first value,
- deriving from a comparison of the variation of the first envelope as a function of time and a variation of the second envelope as a function of time, the indicator indicating whether the read beam is directed to the groove or to the land portion.

The comparison of the two envelopes allows an even more robust and reliable indication than an indication based on a single envelope with a single tracking error polarity selector value.

The computer program product according to the present invention is arranged to be loaded in a programmable processor and to perform any one of the above methods.

The implementation in a computer program product allows to easily adapt or extend the methods

SHORT DESCRIPTION OF FIGURES

These and other aspects of the invention will be further elucidated and described in detail with reference to the drawings, in which corresponding reference symbols indicate corresponding parts:

FIG. 1a schematically shows the top-view of an optical disk;

Figure 2:
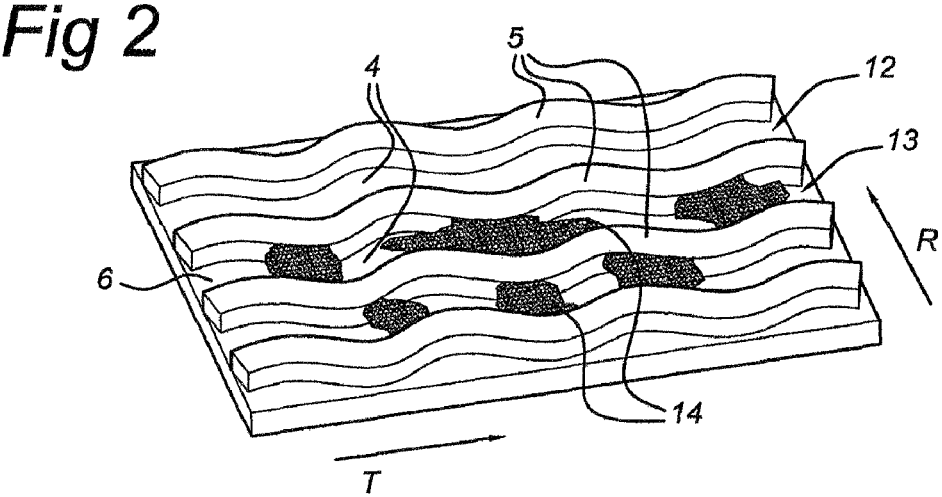
Figure 4A:
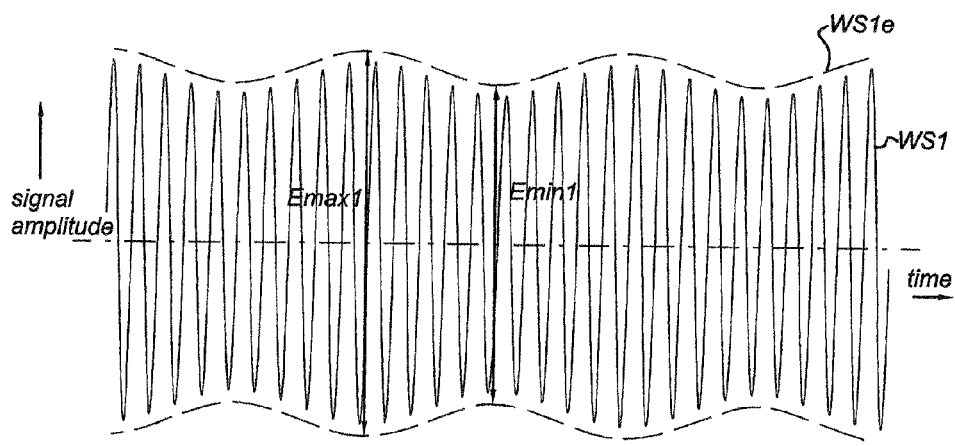
Figure 4B:
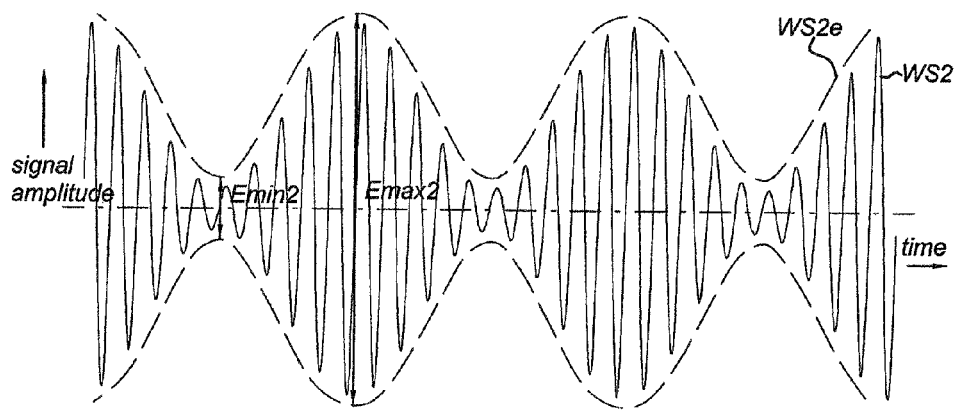
Figure 5:
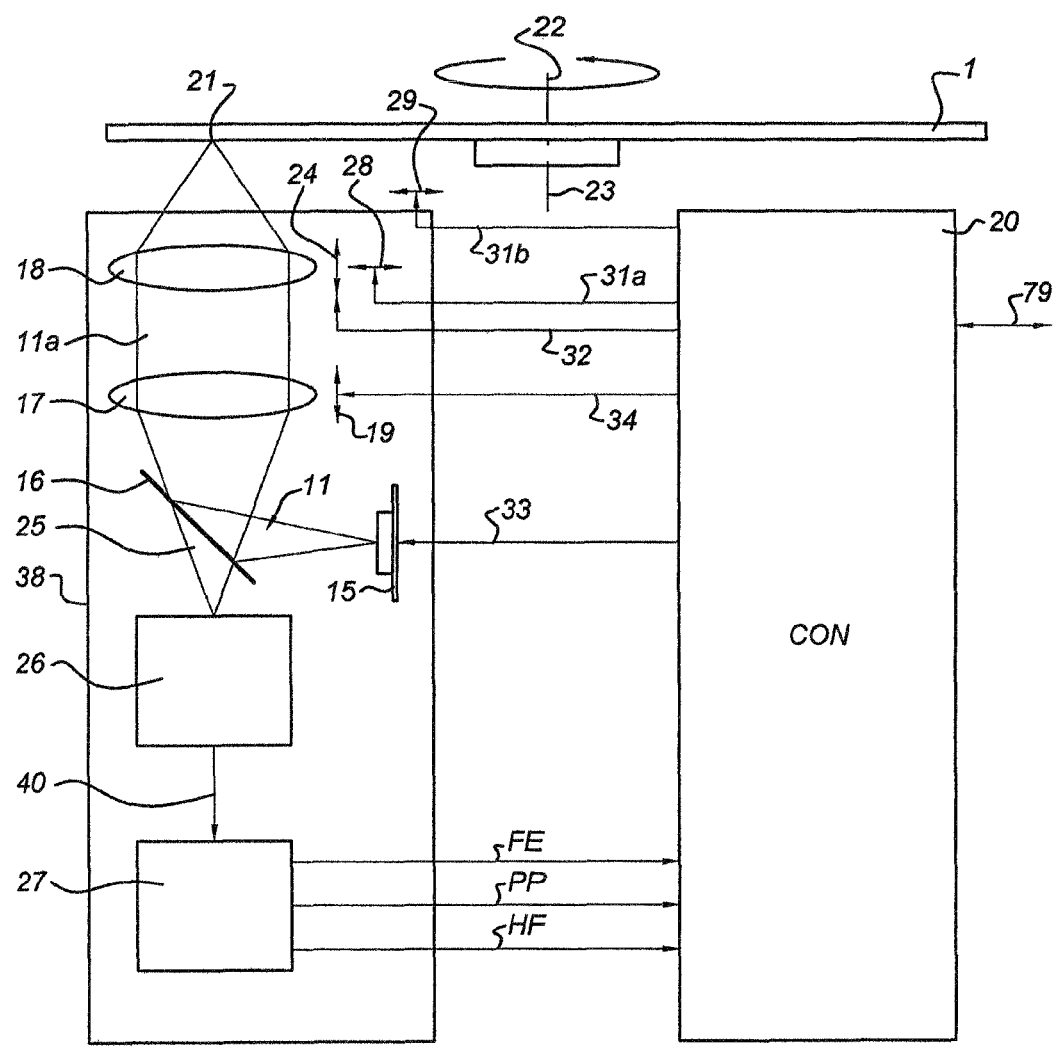
Figure 6A:
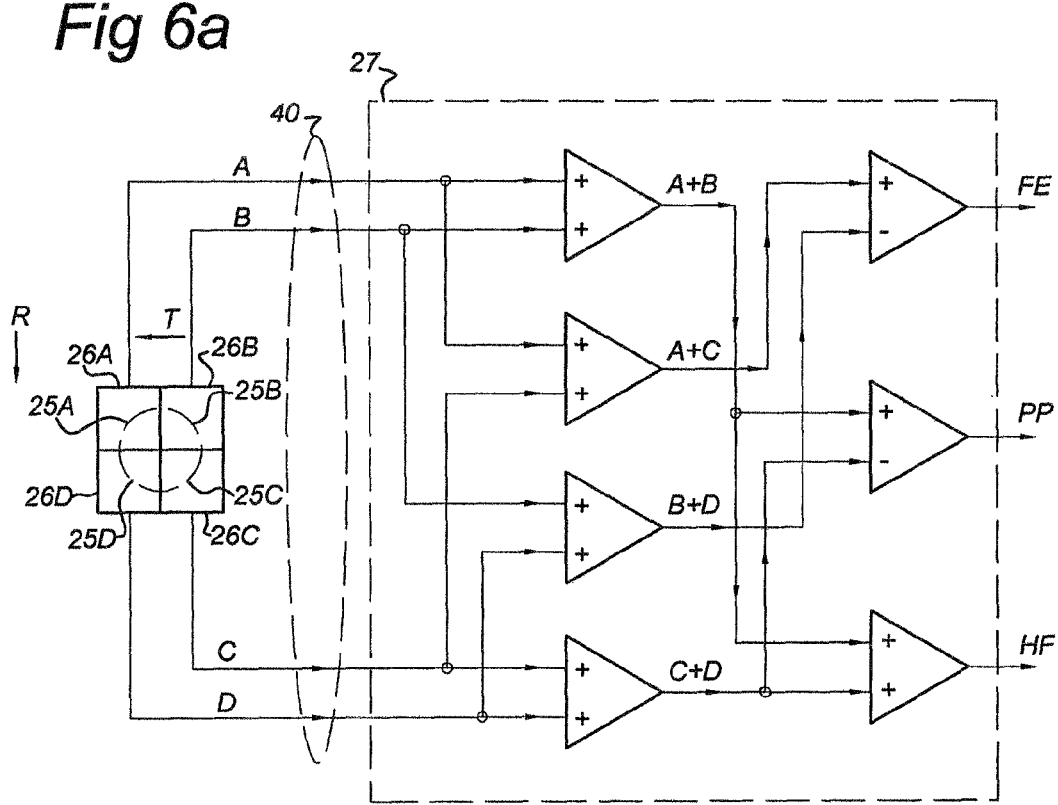
Figure 6B:
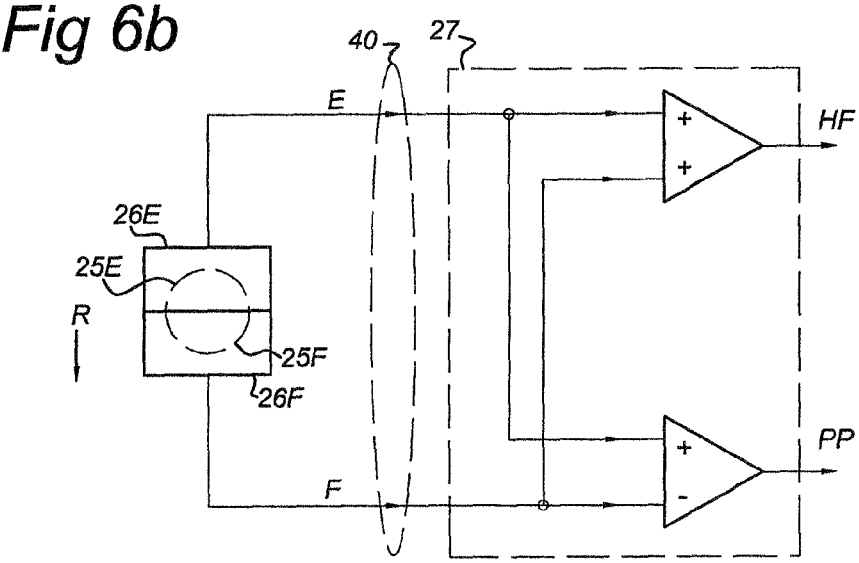
Figure 7:
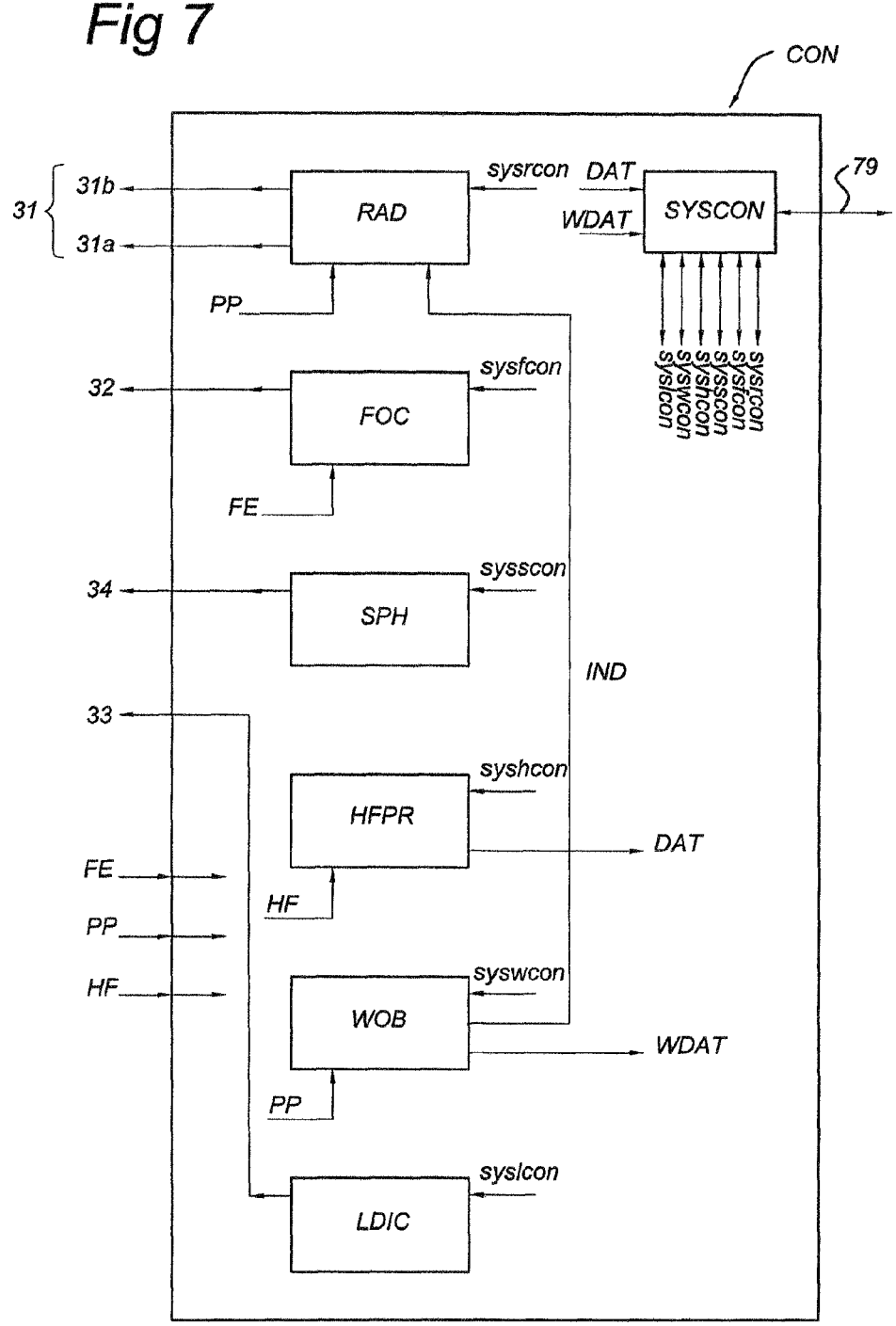
Figure 8:
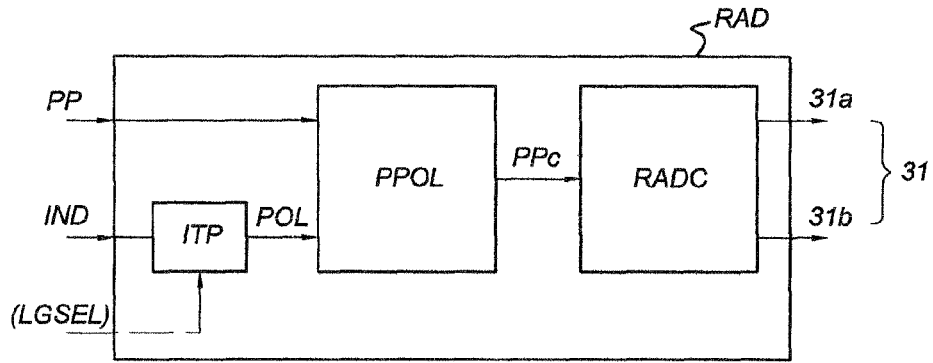
Figure 9A:
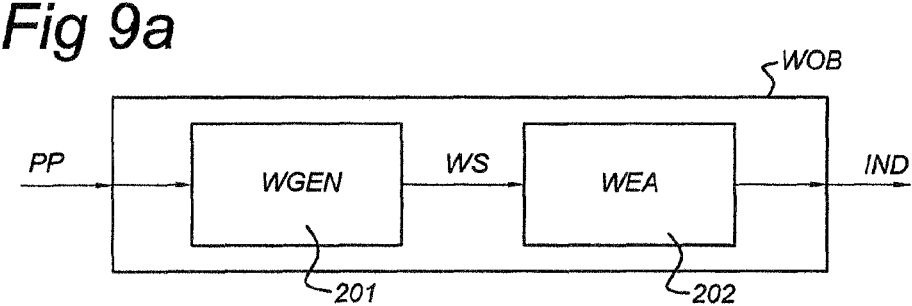
Figure 9B:
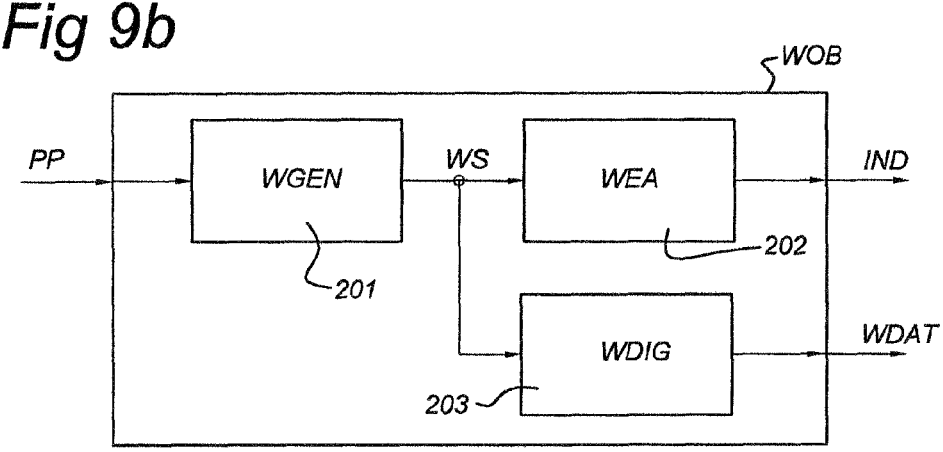
Figure 9C:
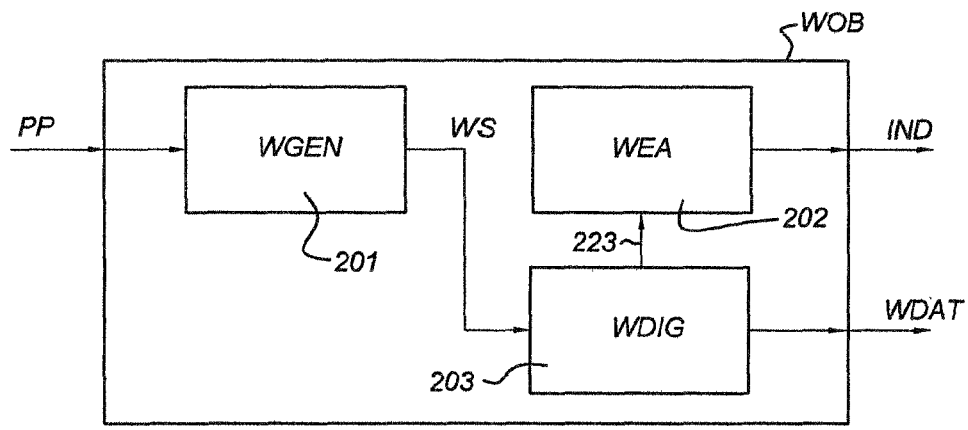
Figure 9D:
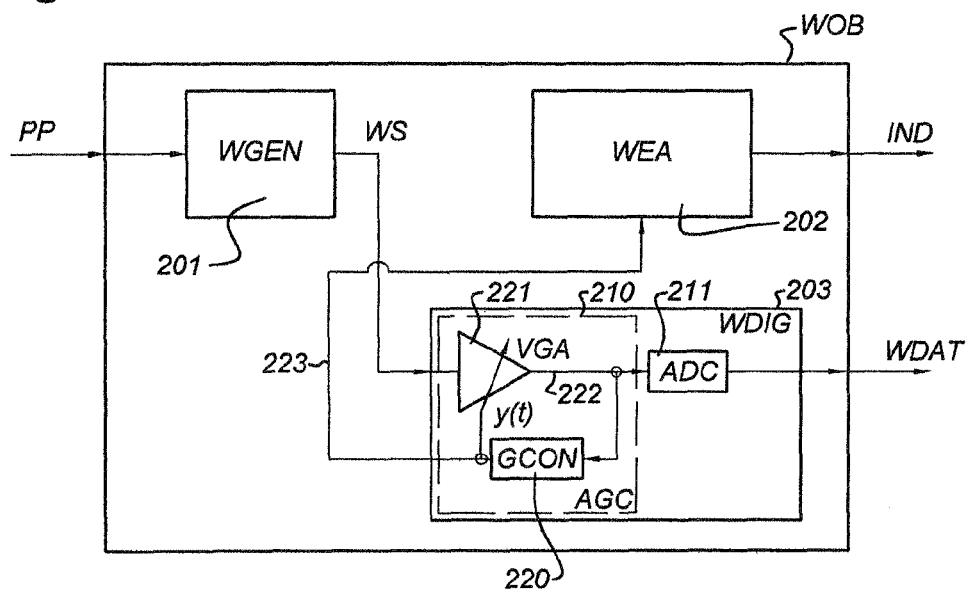
Figure 10:
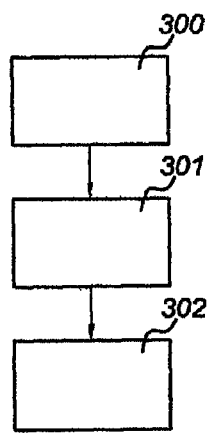
Figure 11:
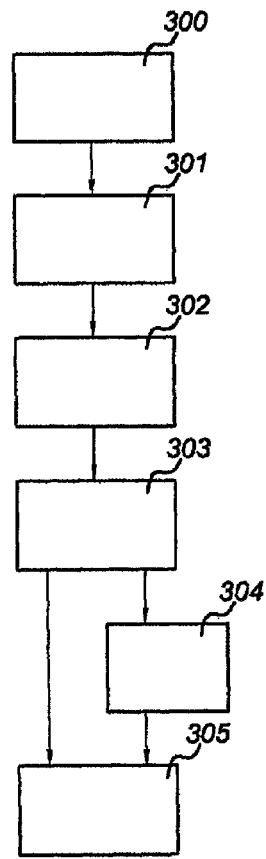
Figure 12:
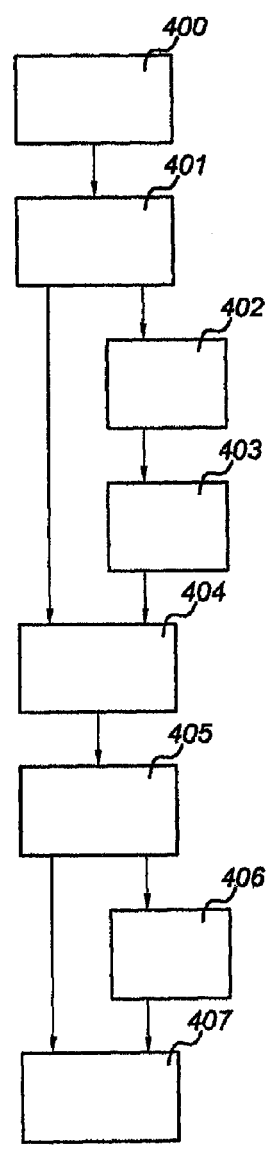
Figure 13:
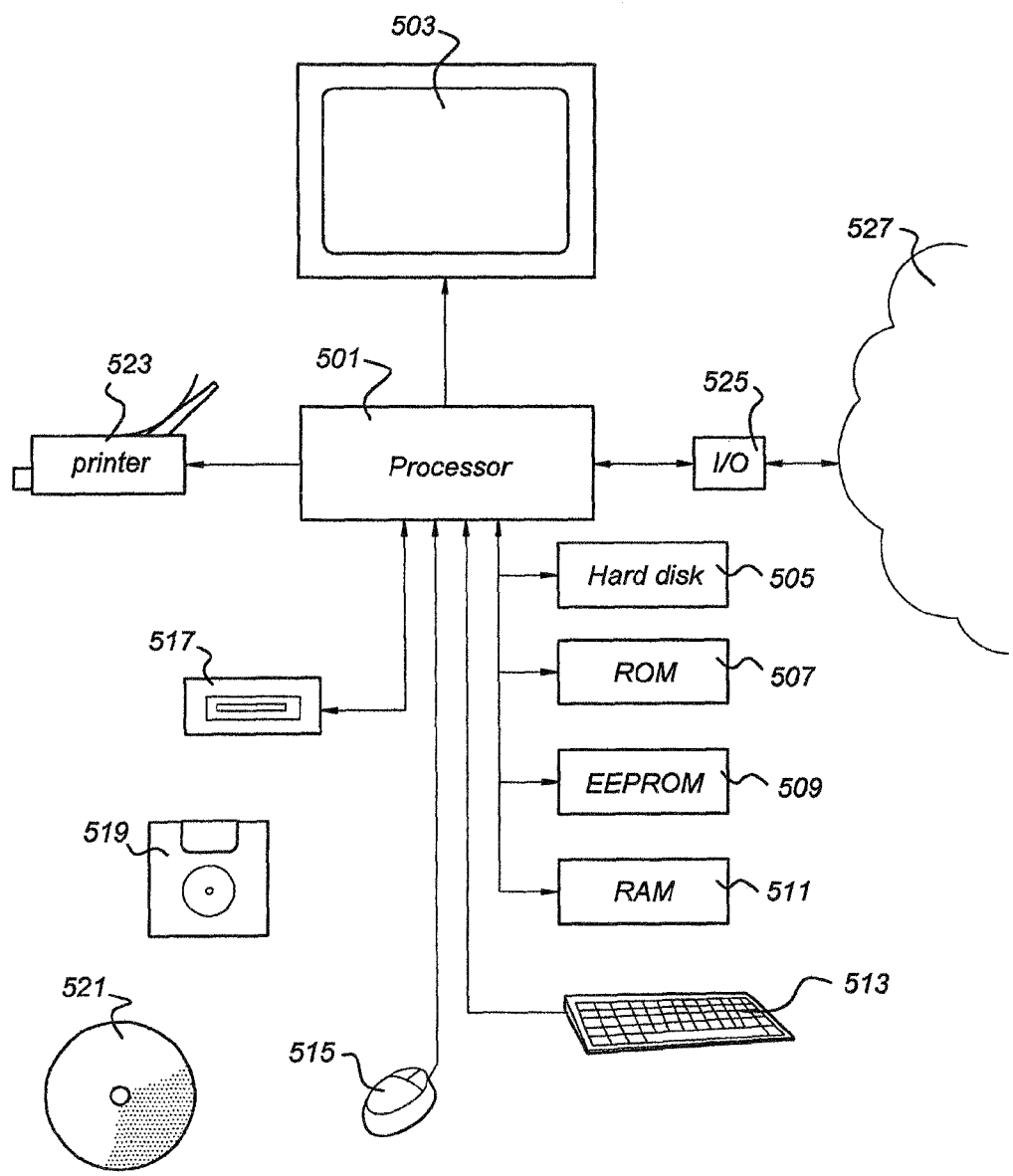

FIG. 2 schematically shows a wobbled groove and recorded information marks in the grooves on an optical disk;

FIG. 3a schematically shows tracking of a groove on in-groove media;

FIG. 3b schematically shows tracking of a groove on on-groove media;

FIG. 3c schematically shows tracking of a land on on-groove media;

FIG. 4a shows the wobble signal while tracking the groove;

FIG. 4b shows the wobble signal while tracking the land;

FIG. 5 schematically shows an optical disk drive;

FIG. 6a schematically shows a signal processing unit of an optical disk drive;

FIG. 6b schematically shows an alternative signal processing unit of an optical disk drive;

FIG. 7 schematically shows a controller of an optical disk drive;

FIG. 8 schematically shows a tracking controller of an optical disk drive;

FIG. 9a schematically shows a wobble processor of an optical disk drive with an envelope analyzer;

FIG. 9b schematically shows an alternative wobble processor of an optical disk drive;

FIG. 9c schematically shows another alternative wobble processor of an optical disk drive;

FIG. 9d schematically shows another alternative wobble processor of an optical disk drive;

FIG. 10 shows a block diagram of a method according to the invention;

FIG. 11 shows a block diagram of a further method according to the invention;

FIG. 12 shows a block diagram of an alternative method according to the invention;

FIG. 13 shown an overview of a computer arrangement that can be used to carry out the method according to the invention.

DETAILED DESCRIPTION OF EMBODIMENTS OF THE INVENTION

Figure 1A:
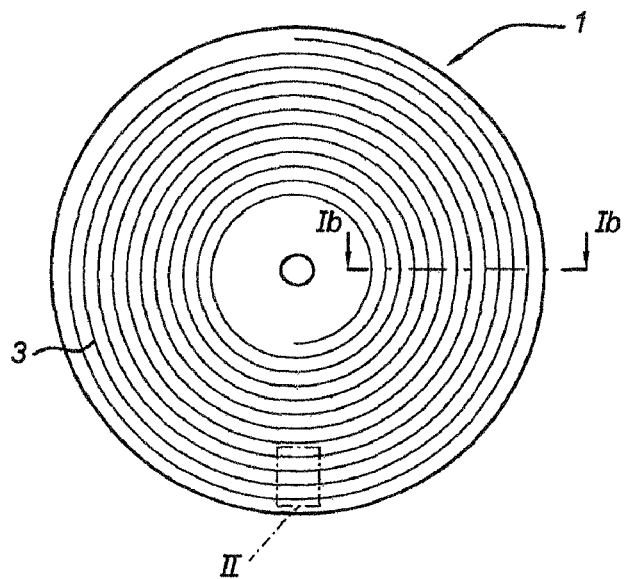
FIG. 1b shows a cross section an optical disk with one recording layer.
FIG. 1c shows a cross section an optical disk with two recording layers.
Figure 1B:
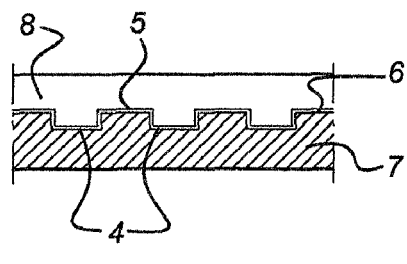
Figure 1C:
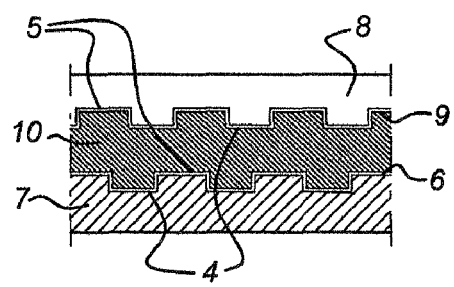

FIG. 1a-c show an optical disk 1 and FIG. 2 shows a detailed view of area II of the optical disk 1. The optical disk has a substantially circular, spiralling track 3. The track 3 is a groove 4 in a surrounding surface area 5, also called land. The groove can be an indentation in a substrate 7, or an elevation on the substrate 7. In this context, the word 'groove' originates from the manufacturing process of the substrate 7, in which an indentation is made by a so-called mastering process in a master. The multiplication of this single master is done in various steps, including a step of replication of a positive or negative into a large number of substrates. Depending on the type of multiplication, a groove indented in the substrate or elevated on the substrate results. A recording layer 6 is deposited on the substrate 7. The recording layer is covered with a transparent cover layer 8. In a BluRay disk, the transparent cover layer has a nominal thickness of 0.100 mm, and access of the tracks is done through this transparent cover layer. In a DVD disk, access is done through the substrate 7, which has a thickness of 0.6 mm.

A BluRay disk may alternatively comprise a flat substrate 7, with the track 3 being replicated in or on the cover layer 8 and the recording layer 6 being deposited in the cover layer 8. The cover layer 8 can, e.g., be a foil sheet, which is glued to the substrate 7.

The optical disk 1 may have a single recording layer 6 as shown in FIG. 1b in a cross-sectional view of the optical disk 1 along the line Ib in FIG. 1a. The optical disk 1 may also have multiple recording layers 6, 9, separated by a transparent spacer layer 10 as shown in FIG. 1c for an optical disk 1 with two recording layers 6, 9.

The disk is thus produced as a disk with empty tracks 12. The track can accommodate marks 14 which can be written on the track with an optical disk drive. These marks can be erased and overwritten in, e.g., a rewritable BluRay disk (BD-RE disk), but can also be of a permanent nature as in a recordable BluRay disk (BD-R disk). The marks are of different lengths, and carry data information. These marks can be read out with a disk drive, as these marks result in a modulation of light reflected on the disk, which is detected by the disk drive with a sensor.

As shown in FIG. 2, the track 3 has a sinusoidal deviation from its nominal position into the radial direction R of the disk. This sinusoidal deviation is called the wobble. The wobble can be a fixed-frequency continuous sinusoidal for use as a time reference signal, e.g., to which the disk speed or a signal clock can be related, or a modulated sinusoidal encoding wobble data information, e.g., a frequency-modulated sinusoidal with a modulation around a centre frequency encoding or a phase-modulated sinusoidal with a modulation at a fixed frequency. Various standardized optical disk systems use the wobble for carrying information to classify the disk and the values of various parameters, e.g., the address of a specific location on the disk. Disks according to the DVD+RW, BD-RE and BD-R standards have a phase-modulated wobble at a fixed spatial period measured along the track. Disks according to the DVD-RW standard have a frequency-modulated wobble.

FIGS. 3a-3c shows two types of BluRay disks, the in-groove type 100 and the on-groove type 101, and two types of tracking a BluRay disk, groove-tracking and land-tracking.

FIG. 3a shows a cross section of a BluRay disk of the in-groove type 100 along a part of the line B-C in FIG. 1. The groove 4 is an indentation in the substrate 7. The optical spot 21 is focussed in the groove 4 through the cover layer 8 with a spot profile 21a. The peak of the intensity of the spot is positioned in the groove, but the spot profile extends onto the land part. Under this condition, the wobble can be reliably and correctly detected and decoded by the optical disk drive, as will be described later.

FIG. 3b shows a cross section of an alternative BluRay disk, i.e., one of the on-groove type 101, along a part of the line B-C in FIG. 1. The groove 4 is an elevation on the substrate 7. The optical spot 21 is shown to be focussed on the groove 4. Under this condition, the wobble can again be reliably and correctly detected and decoded.

FIG. 3c shows again a cross section of a BluRay disk of the on-groove type 101. The optical spot 21 should be focussed in the groove 4 as was shown in FIG. 3b, but is focussed on the land 5 because the drive incorrectly assumed that the disk was of the in-groove type. The major part of the intensity of the spot is positioned on the land, but the spot profile extends onto the groove parts on either sides, and the wobble of both grooves will contribute to the sensor signal in the optical disk drive. Under this condition, the wobble can not be detected and decoded reliably and correctly, as the wobble signal in the optical disk drive will comprise the contributions of the groove. It can occur that the wobble can not be detected and decoded at all. It could also occur that an erroneous wobble signal is detected and decoded, e.g., when the wobble signal of an adjacent groove is detected with an asymmetric spot profile when the disk is tilted. The same erroneous situation can occur when the drive correctly decides on the position of the groove relative to the surrounding surface, but when the recording layer is such that it makes the disk look like that of the other type.

FIG. 4a shows a wobble signal WS1 with an envelope WS1e as detected in an optical disk drive when tracking a groove 4 in an in-groove BD disk 100 or on-groove BD-disk 101, as in FIGS. 3a and 3b respectively. The detection will be described in detail later. The sinusoidally wobbled grooved would result in a wobble signal that is a perfect sinusoidal when the focussing spot 21 would only see the groove itself. However, as shown in FIGS. 3a-3c, the focussing spot also captures a fraction of each of the neighbouring grooves, one full turn of the spiral towards the inner and outer side of the disk. Although those wobbles have the same linear period, their angular period is a bit different. This results in a small contribution to the signal of the tracked groove of the neighbouring grooves, resulting in an interference of the contributions on the detector in the optical disk drive. This is observed as a variation in the peak-peak amplitude of the wobble signal, i.e., as a variation in the envelope WS1e, between a minimum value Emin1 and a maximum value Emax1. Under the least optimal conditions, this can result in a wobble signal of which the envelope varies as a function of time between minimum value Emin1 of 70% to 100% and maximum value Emax1 of 100% of its maximum value Emax1. In other words, the envelope has a modulation depth M1=(Emax1−Emin1)/Emax1 of 0% to 30%.

FIG. 4b shows a wobble signal WS2 with an envelope WS2e when tracking a land 5 in an in-groove BD disk 100, or an on-groove BD disk 101 as shown in FIG. 3c. In this situation, the focussing spot 21 tracks on a land with a different wobble period on either of its sides. This results in a large interference of the contributions from either side, which is fully destructive at positions where the wobbles on either side are exactly in opposite phase, and fully constructive at positions where the wobbles on either side are exactly in phase. The resulting variation of the envelope WS2e varies between a minimum value Emin2 of 0% to 30% and a maximum value Emax2 of 100% of its maximum value Emax2. In other words, the envelope has a modulation depth M2=(Emax2−Emin2)/Emax2 of 70% to 100%.

FIG. 5 shows an optical disk drive. The optical disk 1 rotates about an axis 22 operated by a motor 23. A laser diode 15 generates an incident optical beam 11, which is directed onto the optical disk via a beam splitter 16, a collimator 17 and an objective lens 18. The beam splitter 16 steers the beam over a 90 degree angle. The collimator 17 produces a substantially parallel incident beam 11a, which is focused by the objective lens 18 into a focussing spot 21 on the track 3. The disk is rotated about the axis 22 by a motor 23 for the spot 21 to scan the tracks along the track. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow radial excursions of the track when the track 3 is somewhat eccentric to the axis 22. A spherical aberration correction actuator 19 can move the collimator lens 17 parallel to its optical axis in order to adjust the convergence of the beam 11a when the thickness of the transparent cover layer 7 of a BluRay disk deviates from its nominal 0.100 mm. When the optical thickness of the cover layer 7 is smaller than the nominal value, the collimator lens 17 is moved towards the objective lens 18 to produce a somewhat more convergent beam 11a. When this beam is focussed on the optical disk, the difference in spherical aberration originating from the different cover layer thickness is compensated for. Likewise, the difference in spherical aberration originating from the spacer layer can also be compensated for when focussing on the different layers of a multi-layer disk. When the thickness is larger, the collimator lens is moved away from the objective lens 18 to produce a somewhat more divergent beam 11a. Also various alternative methods for spherical aberration correction may be used, such as an actuated liquid crystal lens, an actuated telescope or an actuated dual-objective lens design. A control unit 20 controls the actuators 24, 28, 29 and 19 to keep the optimal positions for the objective lens and the collimator position while the disk is rotating. The optical disk reflects the incident beam. The reflected beam 25 is separated from the incident beam by the beam splitter 16. An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27. The entire optical system is fitted onto a single support so as to constitute an integrally moveable optical head 38. The movement of the optical head is performed by a head motor 29.

As is shown in detail in FIG. 6a, the sensor may be a quadruple photodetector 26, having four sensor segments 26A-26D for sensing the intensities of four portions of the reflected beam 25. The sensor signal comprises four channels, A-D, one for each sensor segment. The arrow R represents the relation between the beam portions and the radial direction of the optical disk 1 and the arrow T represents the relation between the beam portions and the tangential direction of the optical disk 1. I.e., sensor 26A and 26B detect intensities corresponding to the inner upper and inner lower quarters respectively of spot 21 as reflected by the optical disk 1, and sensor 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a data signal HF=A+B+C+D, a radial tracking error signal or radial push-pull signal PP=(A+B)−(C+D) and, for an astigmatic focussing method, a focus error signal FE=(A+C)−(B+D). The error signal may be of this form, but may also be normalized, with a normalized radial push-pull signal NPP=((A+B)−(C+D))/(A+B+C+D) and a normalized focus error signal NFE=((A+C)−(B+D))/(A+B+C+D). Another focussing method may alternatively be used, such as the spot-size method or the Foucault method, with a corresponding focus error signal FE.

As shown in FIG. 6b, the sensor may also be a double photodetector 26, having two sensor segments 26E-26F for sensing the intensities of two portions of the reflected beam 25. The sensor signal comprises two channels, E-F, one for each sensor segment. Sensor 26E and 26F detect intensities corresponding to the inner and outer halves respectively of spot 21 as reflected by the optical disk 1. The pre-processing unit 27 processes the intensity signals E-F generated by the sensor segments 26E-26F so as to produce a data signal HF=E+F and a radial tracking error signal or radial push-pull signal PP=E−F. The error signal may be of this form, but may also be normalized, with a normalized radial push-pull signal NPP=(E−F)/(E+F). With this double photodetector 26, the focus error signal needs to be derived from another detection circuit.

FIG. 7 shows a control unit CON of the optical disk drive. The control unit CON may include one or several microprocessors or digital signal processors. The control unit CON is responsible for several control tasks. The tasks can be executed in the control unit itself, or in external processor cooperating with the control unit.

The data signal HF is passed to a data recovery mechanism HFPR, which is not shown and need not to be further described here.

The radial push-pull signal PP (or NPP) is passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal has a predetermined value, also called tracking offset. This tracking offset is usually zero. When the tracking control system is not yet active, i.e., when it is not actively tracking a groove or a land, the tracking error signal behaves as a sinusoidal signal approximately symmetrically around zero. The tracking error signal crosses the zero level at two positions, one corresponding to tracking the centre of the groove and the other corresponding to tracking the centre of the land. The two are discriminated by the polarity of the slope of the zero crossing, which is positive for one of the two situations and negative for the other. This is accommodated for in the tracking control system by fixing the slope of the zero-crossing in the control system and inverting the tracking error signal in dependence on which of the two to track, land or groove.

The focus error signal FE (or NFE) is passed to a focus controller FOC. Arrow 32 represents the capability of the focus controller FOC to control the focus actuator 24, so as to keep the focussing spot 21 focussed at the correct depth in the track 3. For this purpose, the focus controller FOC controls the focus actuator 24 such that the focus error signal has a predetermined value, also called focus offset.

Arrow 33 denotes the capability of a laser driver controller LDIC to control the laser diode 15, for example to modulate a current through the laser diode 15 in order to write data onto the optical disk 1.

Arrow 34 denotes the capability of a spherical aberration correction controller SPH to control the spherical aberration correction actuator 19, which will not be further described here.

The radial push-pull signal PP (or NPP) is also passed to a wobble processor WOB. The wobble processor WOB generates the indicator IND indicating whether the optical spot is directed to the groove or the land portion of the optical disk. The wobble processor WOB may also generate a digital wobble data signal WDAT. The digital wobble data signal WDAT may further be processed by a digital processor SYSCON, in order to retrieve so-called wobble data coded in the wobble. The wobble data may, e.g., comprise the physical address of the location on the disk, laser power parameters for writing marks, disk information such as the disk manufacturer. The retrieval and use of the wobble data will not be further described here.

The digital processor SYSCON may also provide and monitor information, such as control settings, via control lines SYSHCON, SYSRCON, SYSFCON, SYSLCON, SYSSCON, SYSWCON to and from the data recovery mechanism HFPR, the radial tracking controller RAD, the focus controller FOC, the laser driver controller LDIC, the spherical aberration correction controller SPH and the wobble processor WOB. The digital processor SYSCON may also interface via 79 to external components, e.g., a host computer in which the optical disk drive is mounted.

FIG. 8 shows the tracking controller RAD, receiving the radial push-pull signal PP and the indicator IND, and comprising a radial actuator driver controller RADC, a push-pull polarity invertor PPOL and an indicator processor ITP. The indicator processor ITP generates from the indicator IND a preferred tracking error polarity selector value POL. The push-pull polarity invertor PPOL receives the radial push-pull signal PP and the preferred tracking error polarity selector value POL and can invert the polarity of the radial push-pull signal PP in dependence of the preferred tracking error polarity selector value POL to obtain a radial push-pull controller signal PPc. The radial actuator driver controller RADC controls the tracking actuator 28 in dependence of the radial push-pull controller signal PPc such that the position of optical spot 21 is at the nominal position of the groove 4.

It should be understood by a person skilled in the art that the indicator processor ITP may also be implemented in another functional block in the controller CON, e.g., in the wobble processor WOB, without departing from the scope of the invention.

The indicator IND as well as the preferred tracking error polarity selector value can be of many different types, e.g., an internal signal in a functional block, an external signal between two functional blocks, a value stored in a register in a functional block, a memory value in the controller, or a memory value in an external memory.

FIG. 8 shows that the tracking controller may also receive an optional land/groove selector LGSEL. The land/groove selector LGSEL can have two values, one value corresponding to groove tracking and the other corresponding to land tracking. The land/groove selector is normally set to correspond to groove tracking for an optical disk with a groove-only recording format like BD-RE, BD-R, DVD+RW, DVD+R, DVD-RW or DVD-R disks, and may be hard-coded in the controller. It may also be obsolete, in which case it is assumed to correspond to groove tracking. For so-called land-groove format like DVD-RAM, the selector can take either value, depending on whether the groove or land portion needs to be addressed. When the land/groove selector LGSEL has a value corresponding to land tracking, the polarity signal POL is changed from the preferred tracking error polarity selector value to the other tracking error polarity selector value. For the groove-only formats, the land/groove selector is only set to correspond to land tracking when a non-typical operation needs to be done.

FIGS. 9a-9d show different embodiments of the wobble processor WOB comprising an envelope analyser WEA.

FIG. 9a shows a wobble processor WOB comprising a wobble signal generator WGEN 201 and a wobble envelope analyser WEA. The wobble signal generator WGEN 201 filters the incoming radial push pull signal PP to obtain an analogue wobble signal WS, e.g., with a low-pass filter to clean it from possible high frequency data components, or with a band-pass filter centered around the nominal wobble frequency. The wobble signal WS is received by the wobble envelope analyser WEA to analyse the envelope of the amplitude of the wobble signal and to measure the variation of the envelope over time. As described with reference to FIGS. 4a and 4b, the variation of the wobble envelope is a reliable indication to know whether the drive is tracking the groove 4 or the land 5, i.e., tracking the groove 4 with a clear wobble signal with an envelope with a low variation as shown in FIG. 4a, or tracking the land with a wobble signal with an envelope with a large variation as shown in FIG. 4b. The wobble envelope analyser WEA thus generates an indicator IND, indicating whether the drive is tracking the groove or the land.

The wobble envelope analyser WEA can measure the variation over time as a modulation depth of the envelope, a variance or a standard deviation of the envelope, or any other statistical measure for the variation of the envelope.

The wobble envelope analyser WEA may base its result on the measurement of a variation of a single wobble signal envelope, and, e.g., conclude that the drive was tracking a groove if the modulation depth was less than 30%, or a land if the modulation depth was larger than 70%.

Preferably, the wobble envelope analyser WEA bases its decision on the comparison of two measurements of the envelope, one for each of the tracking polarities. The envelope with the smallest variation corresponds to groove tracking.

FIG. 9b shows a wobble processor WOB comprising also a wobble digitizer WDIG. The wobble digitizer WDIG digitizes the analogue wobble signal WS to a digital wobble data signal WDAT. The digital wobble data signal WDAT may be further processed by the control unit CON to extract, e.g., the addressing information carried by the wobble data signal WDAT. This addressing information may be used, for example, in order to derive the current position of spot 21 on the optical disk 1. During reading or writing, the control unit CON 20 compares the current position of the spot 21 with the desired position and determines parameters for a jump of the optical system to the desired position. The parameters of the jump are fed to the radial tracking controller RAD.

FIG. 9c shows a wobble processor WOB wherein the wobble envelope analyser WEA cooperates with the wobble digitizer WDIG in order to analyse the wobble envelope. The wobble digitizer WDIG generates an intermediate signal 223, which is any measure of the wobble envelope, and is used by the wobble envelope analyser WEA to measure the variation of the wobble envelope. A specific embodiment of this wobble processor WOB is given in FIG. 9d.

FIG. 9d shows a detailed implementation of the wobble processor WOB. The wobble processor WOB has a wobble signal generator WGEN 201, an envelope analyzer WEA 202 and a wobble signal digitizer WDIG 203. The wobble signal generator WGEN 201 filters the incoming radial push pull signal PP to an analogue wobble signal WS, e.g., with a low-pass filter to clean it from possible high frequency data components, or with a band-pass filter centered around the nominal wobble frequency. The wobble signal digitizer WDIG 203 digitizes this analogue wobble signal WS into a digital wobble data signal WDAT, which is passed to the control unit CON for further wobble data processing. The wobble signal digitizer WDIG 203 uses an automatic gain control circuit (AGC) 210 to amplify the analogue wobble signal WS to the appropriate and substantially constant input amplitude of an analogue-to-digital converter (ADC) 211 which digitizes the signal into the digital wobble data signal WDAT. The AGC has a gain control unit 220 and a variable gain amplifier (VGA) 221. The gain control unit 220 adjusts the gain of the VGA 221 until the amplitude of the analogue output 222 of the VGA is in a predetermined range and has a substantially constant envelope. The gain control signal y(t) 223 is a digital signal of which the size is indicative for the true peak-peak amplitude of the wobble signal WS, i.e., its envelope. More specifically, the gain control signal y(t) 223 is roughly inversely proportional to the wobble envelope. The gain control signal y(t) 223 is passed to the wobble envelope analyzer WEA 202 in order to measure its variation and derive the indicator: the variation of the gain control signal y(t) over time is a direct measure for the variation of the wobble envelope WSe. The wobble envelope analyzer WEA may measure a modulation depth of the gain control signal y(t), a variance or a standard deviation of the gain control signal y(t), or any other statistical measure for the variation of the gain control signal y(t).

Many modern optical disk drive controller ICs use a wobble digitizer WDIG comprising an AGC of the kind shown in FIG. 9d. The gain control signal y(t) is generally available as, e.g., a digital signal or as digital signal values stored in a block of memory, to a microcontroller for monitoring the behavior of the AGC for, e.g., allowing to interfere when there is a risk that the ADC would saturate. The method according to the invention can thus be easily implemented in a modern optical disk drive, by implementing the wobble envelope analyzer WEA in software code in the microcontroller.

FIG. 10 shows a block diagram of a method according to the invention. In a first action 300, the sensor signal is received. The envelope of the sensor output signal amplitude is analyzed in a subsequent second action 301. In a third action 302, the indicator is derived.

FIG. 11 shows a block diagram of a further method according to the invention. After the actions 300, 301, 302, the preferred tracking error polarity selector value is derived in action 303. The tracking error signal is derived in action 304, and in action 305, the tracking actuator is driven in dependence of the preferred tracking error polarity selector value from action 303 and the tracking error signal from action 304.

FIG. 12 shows a block diagram of a further method according to the invention. In a first action 400, the sensor signal is received while the tracking controller in the optical disk drive using the push-pull signal with one polarity. In a second action 401, the envelope of the sensor output signal amplitude is analyzed. In a third action 402, the sensor signal is received while the tracking controller in the optical disk drive using the push-pull signal with the other polarity. In a fourth action 403, the envelope of the sensor output signal amplitude is analyzed. In a fifth action 404, the indicator is derived from a comparison of the variation of the two envelopes. The preferred tracking error polarity selector value is then derived from this indicator in action 405. The tracking error signal is derived in step 406, and the tracking actuator is driven in dependence of the preferred tracking error polarity selector value from action 405 and the tracking error signal from action 406.

In FIG. 13, an overview is given of a computer arrangement that can be used to carry out the method according to the invention. The arrangement comprises a processor 501 for carrying out arithmetic operations.

The processor 501 is connected to a plurality of memory components, including a hard disk 505, Read Only Memory (ROM) 507, Electrically Erasable Programmable Read Only Memory (EEPROM) 509, and Random Access Memory (RAM) 511. Not all of these memory types need necessarily be provided. Moreover, these memory components need not be located physically close to the processor 501 but may be located remote from the processor 501.

The processor 501 is also connected to means for inputting instructions, data etc. by a user, like a keyboard 513, and a mouse 515. Other input means, such as a touch screen, a track ball and/or a voice converter, known to persons skilled in the art may be provided too.

A reading unit 517 connected to the processor 501 is provided. The reading unit 517 is arranged to read data from and possibly write data on a data carrier like a floppy disk 519 or a CD 521. Other data carriers may be tapes, DVD, BD, etc. as is known to persons skilled in the art.

The processor 501 is also connected to a printer 523 for printing output data on paper, as well as to a display 503, for instance, a cathode-ray tube monitor or a LCD (Liquid Crystal Display) screen, or any other type of display known to persons skilled in the art.

The processor 1 may be connected to a communication network 527, for instance, the Public Switched Telephone Network (PSTN), a Local Area Network (LAN), a Wide Area Network (WAN), etc. by means of I/O means 525. The processor 501 may be arranged to communicate with other communication arrangements through the network 527.

The data carrier 519, 521 may comprise a computer program product in the form of data and instructions arranged to provide the processor 501 with the capacity to perform a method in accordance with the invention. However, such computer program product may, alternatively, be downloaded via the telecommunication network 527.

The processor 501 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 501 through the network 527.

It should be noted that the above-mentioned embodiments illustrate rather than limit the invention, and that those skilled in the art will be able to design many alternative embodiments without departing from the scope of the appended claims. E.g., an alternative definition may be used for modulation depth or a digital signal could be used where an analogue signal may be suggested and vice versa, without departing from the scope of the invention and the appended claims. In the claims, any reference signs placed between parentheses shall not be construed as limiting the claim.

The invention claimed is:

1. An optical disk drive for scanning an optical disk comprising a substantially circular groove and a land portion separating adjacent parts of said groove, the groove being wobbled, comprising:
 a beam generator for generating a read beam and directing said read beam to said optical disk,
 a sensor for sensing a reflected beam produced by said optical disk upon receiving said read beam, and for producing a sensor output signal with a sensor output signal amplitude,
 an envelope analyzer arranged to:
  receive said sensor output signal from said sensor,
  analyze a first envelope of said sensor output signal amplitude,
  derive a modulation depth M of said first envelope as a variation of said first envelope as a function of time,
 an indicator for indicating whether said read beam is directed to said groove or to said land portion according to the modulation depth,
 wherein the modulation depth M is defined as:
 M=(Emax-Emin)/Emax
 wherein Emax is the maximum value of the envelope and Emin is the minimum value of the envelope.

2. An optical disk drive according to claim 1, further comprising:
 a tracking actuator for positioning said read beam at a radial position along the disk,
 a tracking control device arranged to:
  receive said sensor output signal from said sensor,
  generate a tracking error signal from said sensor output signal,
  drive the tracking actuator in dependence of said tracking error signal and a tracking error polarity selector,
  the tracking error polarity selector having either a first value or a second value, the second value being different from the first value,
 in order to position said read beam directed to either said groove or said land portion, depending on the value of the tracking error polarity selector.

3. An optical disk drive according to claim 2, wherein, in order to drive the tracking actuator in dependence of said tracking error signal with a tracking error signal polarity and said tracking error polarity selector, the tracking control device is arranged to invert the tracking error signal polarity when said tracking error polarity selector has the second value and the tracking control device is arranged to not invert the tracking error signal polarity when said tracking error polarity selector has the first value.

4. An optical disk drive according to claim 2, wherein the tracking error polarity selector has a preferred tracking error polarity selector value in order to position said read beam directed to said groove.

5. An optical disk drive according to claim 4, wherein the tracking control device is arranged to derive the preferred tracking error polarity selector value from said indicator.

6. An optical disk drive according to claim 5, wherein the tracking control device is arranged to
 set the preferred tracking error polarity selector value to the first value when said indicator indicates that said read beam is directed to said groove when the tracking error polarity selector has the first value,
 set the preferred tracking error polarity selector value to the second value when said indicator indicates that said read beam is directed to said land portion when the tracking error polarity selector has the first value,
 set the preferred tracking error polarity selector value to the first value when said indicator indicates that said read beam is directed to said land portion when the tracking error polarity selector has the second value,
 set the preferred tracking error polarity selector value to the second value when said indicator indicates that said read beam is directed to said groove when the tracking error polarity selector has the second value.

7. An optical disk drive according to claim 2, wherein the envelope analyzer is arranged to:
 analyze the first envelope of said sensor output signal amplitude when the tracking control device drives the tracking actuator with the first value of said tracking error polarity selector,
 analyze a second envelope of said sensor output signal amplitude when the tracking control device drives the tracking actuator with the second value of said tracking error polarity selector,
 derive a first modulation depth of said first envelope as the variation of said first envelope as a function of time,
 derive a second modulation depth of said second envelope as the variation of said second envelope as a function of time,
 compare the first modulation depth and the second modulation depth,
 the indicator is arrange to indicating indicate whether said read beam is directed to said groove or to said land portion according to the comparing result.

8. An optical disk drive according to claim 7, wherein driving with the first value of said tracking error polarity selector and driving with the second value of said tracking error polarity selector is done on the same radial positions of the optical disk.

9. An optical disk drive according to claim 7, wherein the envelope analyzer is arranged to set the indicator to indicate that said read beam is directed to said groove when the first modulation depth is smaller than the second modulation depth.

10. An optical disk drive according to claim 9, wherein the envelope analyzer is arranged to set the indicator to indicate that said read beam is directed to said land portion when the second modulation depth is smaller than the first modulation depth.

11. An optical disk drive according to claim 1, wherein the envelope analyzer is arranged to set the indicator to indicate that said read beam is directed to said groove when the modulation depth of the envelope is smaller than a first modulation threshold.

12. An optical disk drive according to claim 1, wherein the envelope analyzer is arranged to set the indicator to indicate that said read beam is directed to said land portion when the modulation depth of the envelope is larger than a second modulation threshold.

13. An optical disk drive according to claim 1, wherein the envelope analyzer is arranged to set the indicator during a startup procedure.

14. An optical disk drive according to claim 1, wherein the optical disk drive further comprises a signal processor arranged to:
receive said sensor signal, apply an automatic gain control circuit driven by a gain control signal to said sensor signal, and the envelope analyzer is arranged to:
receive said gain control signal,
use said gain control signal in order to analyze the first envelope of said sensor output signal amplitude.

15. An optical disk drive according to claim 14, wherein the gain control signal is a digital signal.

16. An optical disk drive according to claim 15, wherein the optical disk drive further comprises a digital processor, wherein the envelope analyzer is implemented in the digital processor.

17. An optical disk drive for scanning an optical disk comprising a substantially circular groove and a land portion separating adjacent parts of said groove, the groove being wobbled, comprising:
a beam generator for generating a read beam and directing said read beam to said optical disk,
a sensor for sensing a reflected beam produced by said optical disk upon receiving said read beam, and for producing a sensor output signal with a sensor output signal amplitude,
an envelope analyzer arranged to:
receive said sensor output signal from said sensor,
analyze a first envelope of said sensor output signal amplitude,
derive a standard deviation of said first envelope as a variation of said first envelope as a function of time,
an indicator indicating whether said read beam is directed to said groove or to said land portion according to the standard deviation.

18. An optical disk drive according to claim 17, wherein the envelope analyzer is arranged to set the indicator to indicate that said read beam is directed to said groove when the standard deviation of the envelope is smaller than a first standard deviation threshold.

19. An optical disk drive according to claim 17, wherein the envelope analyzer is arranged to set the indicator to indicate that said read beam is directed to said land portion when the standard deviation of the envelope is larger than a second standard deviation threshold.

20. An optical disk drive according to claim 17, wherein the envelope analyzer is arranged to:
analyze the first envelope of said sensor output signal amplitude when the tracking control device drives the tracking actuator with the first value of said tracking error polarity selector,
analyze a second envelope of said sensor output signal amplitude when the tracking control device drives the tracking actuator with the second value of said tracking error polarity selector,
measure a first standard deviation of said first envelope as the variation of said first envelope as a function of time, and
measure a second standard deviation of said second envelope as the variation of said second envelope as a function of time
compare the first standard deviation and the second standard deviation,
the indicator is arrange to indicate whether said read beam is directed to said groove or to said land portion according to the comparing result.

21. An optical disk drive according to claim 20, wherein the envelope analyzer is arranged to set the indicator to indicate that said read beam is directed to said groove when the first standard deviation is smaller than the second standard deviation.

22. An optical disk drive according to claim 20, wherein the envelope analyzer is arranged to set the indicator to indicate that said read beam is directed to said land portion when the second standard deviation is smaller than the first standard deviation.

23. A method for determining an indicator for use with an optical disk drive, the optical disk drive arranged for scanning an optical disk comprising a substantially circular groove and a land portion separating adjacent parts of said groove, the groove being wobbled, and the optical disk drive comprising:
a beam generator for generating a read beam and directing said read beam to said optical disk,
a sensor for sensing a reflected beam produced by said optical disk upon receiving said read beam, and for producing a sensor output signal with a sensor output signal amplitude,
wherein the method comprises:
receiving said sensor output signal from said sensor,
analyzing a first envelope of said sensor output signal amplitude,
measuring a modulation depth M of said first envelope as a variation of said first envelope as a function of time, wherein the modulation depth M is defined as:
M=(Emax-Emin)/Emax
wherein Emax is the maximum value of the envelope and Emin is the minimum value of the envelope,
indicating whether said read beam is directed to said groove or to said land portion according to the modulation depth by the indicator.

24. A method according to claim 23, further comprising:
deriving a preferred tracking error polarity selector value from said indicator,
generating a tracking error signal from said sensor output signal,
driving a tracking actuator for positioning said read beam at a radial position along the disk in dependence of said tracking error signal and a tracking error polarity selector, with the value of the tracking error polarity selector being the preferred tracking error polarity selector value in order to position said read beam directed to said groove.

25. A method according to claim 24, comprising
analyzing the first envelope of said sensor output signal amplitude when the tracking control device drives the tracking actuator with a first value of said tracking error polarity selector,
analyzing a second envelope of said sensor output signal amplitude when the tracking control device drives the tracking actuator with a second value of said tracking error polarity selector, the second value of said tracking error polarity selector being different from the first value,
deriving a first modulation depth of said first envelope as the variation of said first envelope as a function of time,
deriving a second modulation depth of said second envelope as the variation of said second envelope as a function of time,
comparing the first modulation depth and the second modulation depth, the indicator indicating is arrange to indicate whether said read beam is directed to said groove or to said land portion according to the comparing result.

26. A computer program product arranged to be loaded in a programmable processor and to perform the method of claim 23.

* * * * *